United States Patent
Vallée et al.

(10) Patent No.: US 11,425,557 B2
(45) Date of Patent: Aug. 23, 2022

(54) MONITORING IN A 5G NON-STANDALONE ARCHITECTURE TO DETERMINE BEARER TYPE

(71) Applicant: EXFO Solutions SAS, Saint-Jacques-de-la-Lande (FR)

(72) Inventors: Antoine Vallée, Rennes (FR); Francois Daunay, Noyal Châtillon sur Seiche (FR)

(73) Assignee: EXFO Solutions SAS, Saint Jacques-de-la-Lande (FR)

( * ) Notice: Subject to any disclaimer, the term of this patent is extended or adjusted under 35 U.S.C. 154(b) by 114 days.

(21) Appl. No.: 17/014,079

(22) Filed: Sep. 8, 2020

(65) Prior Publication Data
US 2021/0092591 A1    Mar. 25, 2021

Related U.S. Application Data

(60) Provisional application No. 63/011,607, filed on Apr. 17, 2020, provisional application No. 62/904,865, filed on Sep. 24, 2019.

(51) Int. Cl.
*H04W 8/30* (2009.01)
*H04W 24/02* (2009.01)

(52) U.S. Cl.
CPC ............ *H04W 8/30* (2013.01); *H04W 24/02* (2013.01)

(58) Field of Classification Search
CPC ....... H04W 8/30; H04W 24/00; H04W 24/02; H04W 24/04; H04W 24/08; H04W 76/11; H04W 88/18; H04W 92/24
See application file for complete search history.

(56) References Cited

U.S. PATENT DOCUMENTS 9,538,563 B2    1/2017  Wang et al.
9,763,151 B2    9/2017  Kim
(Continued)

FOREIGN PATENT DOCUMENTS

EP        2 469 761 A1    6/2012
WO     2018190689 A1    10/2018
(Continued)

OTHER PUBLICATIONS 5G non-standalone access, Signaling flow for 5G access via LTE-5G NR dual connectivity (EN DC), https://medium.com/5g-nr/5g-non-standalone-access-4d48cea5db5f, Sep. 16, 2018, pp. 1-12.
(Continued)

*Primary Examiner* — Chi H Pham
*Assistant Examiner* — Weibin Huang
(74) *Attorney, Agent, or Firm* — Clements Bernard Baratta; Lawrence A. Baratta, Jr.

(57) ABSTRACT

Systems and methods include obtaining monitored messages between a Mobility Management Entity (MME) and a Serving Gateway (SGW) in a 5G Non-Standalone (NSA) system; detecting base stations that are gNodeB base stations based on the monitored messages; and storing the detected gNodeB base stations in a database of known gNodeB base stations in the 5G NSA system. The systems and methods can include identifying a bearer as utilizing 5G Radio Access Technology based on a presence of an address associated with the detected gNodeB base stations in the database of known gNodeB base stations. The systems and methods can further include identifying a bearer as utilizing 4G Radio Access Technology based on a lack of the presence of the address in the database of known gNodeB base stations.

20 Claims, 5 Drawing Sheets

(56) References Cited

U.S. PATENT DOCUMENTS

| | | | |
|---|---|---|---|
| 10,069,740 B2 | 9/2018 | Panchal | |
| 10,334,485 B2 | 6/2019 | Chandramouli et al. | |
| 10,506,506 B2 | 12/2019 | Qiao et al. | |
| 10,560,204 B1* | 2/2020 | Patel | H04W 48/12 |
| 10,785,688 B2* | 9/2020 | Yau | H04W 8/04 |
| 10,827,395 B2* | 11/2020 | Dasgupta | H04W 48/17 |
| 10,904,936 B1* | 1/2021 | Zhao | H04W 76/15 |
| 11,146,412 B2* | 10/2021 | Kaki | H04M 15/00 |
| 2012/0155324 A1* | 6/2012 | Janakiraman | H04L 41/12 370/254 |
| 2012/0155428 A1* | 6/2012 | Bovo | H04L 43/18 370/392 |
| 2012/0159151 A1* | 6/2012 | Janakiraman | H04L 9/0844 713/153 |
| 2016/0157159 A1* | 6/2016 | Goi | H04L 43/18 370/329 |
| 2016/0269297 A1 | 9/2016 | Mahindra et al. | |
| 2017/0289882 A1 | 10/2017 | Faccin et al. | |
| 2018/0092142 A1 | 3/2018 | Han et al. | |
| 2018/0139762 A1 | 5/2018 | Cho et al. | |
| 2019/0053104 A1 | 2/2019 | Qiao et al. | |
| 2019/0116631 A1 | 4/2019 | Talebi Fard et al. | |
| 2019/0159273 A1 | 5/2019 | Shi et al. | |
| 2019/0166549 A1 | 5/2019 | Ahmavaara et al. | |
| 2019/0173599 A1 | 6/2019 | Au et al. | |
| 2019/0239123 A1 | 8/2019 | Kim et al. | |
| 2019/0253920 A1 | 8/2019 | Zhang et al. | |
| 2019/0268833 A1 | 8/2019 | Kwok | |
| 2019/0281587 A1 | 9/2019 | Zhang et al. | |
| 2019/0320322 A1 | 10/2019 | Jayawardene et al. | |
| 2019/0342800 A1 | 11/2019 | Sirotkin et al. | |
| 2020/0021689 A1 | 1/2020 | Sultana et al. | |
| 2020/0052916 A1 | 2/2020 | Kaki et al. | |
| 2020/0205212 A1 | 6/2020 | Rahman | |

FOREIGN PATENT DOCUMENTS

| | | |
|---|---|---|
| WO | 2019105560 A1 | 6/2019 |
| WO | 2019153300 A1 | 8/2019 |

OTHER PUBLICATIONS

KT Corp., "Guidance on Secondary RAT Data Volume," 3G TSG RAN WG3 #100 Meeting, R3-182839, Agenda Item 31.3.1.6, May 21-25, 2018, pp. 1-3.

3GPP, "3rd Generation Partnership Project; Technical Specification Group Radio Access Network; Evolved Universal Terrestrial Radio Access (E-UTRA) and NR; Multi-connectivity; Stage 2," Release 16, 3GPP TS 37.340, V16.0.0, Dec. 2019, pp. 1-72.

Sep. 27, 2021, European Search Report issued for European Patent Application No. EP 21 16 8841.

Vivo et al., "NR cell type indication," 3GPP TSG-RAN WG2 Meeting #103, R2-1811773, Aug. 20-24, 2018, pp. 1-3.

Mar. 12, 2021, European Search Report issued for European Patent Application No. EP 20 19 7777.

Keysight Technologies, 5G Boot Camp—Part One: 5G NR Technology Overview, Oct. 2018.

Cisco Systems Inc., MME Administration Guide, StarOS Release 21.8, Apr. 26, 2018, San Jose, USA.

Cisco Systems Inc., Release Change Reference, StarOS Release 21.9/Ultra Services Platform Release 6.3, Jul. 31, 2018, San Jose, USA.

Cisco Systems Inc., 5G NSA for MME, 20 pages, available at least as of Aug. 30, 2019.

NEC Corporation, 5G NSA for MME, 2018, Tokyo, Japan.

Kibria et al., Next generation new radio small cell enhancement: Architectural options, functionality and performance aspects, IEEE Wireless Communications 25, No. 4: 120-128, Apr. 13, 2018, Retrieved at https://arxiv.org/pdf/1802.10267.pdf.

Polese et al., Integrated access and backhaul in 5G mmWave networks: potentials and challenges, arXiv preprint arXiv:1906. 01099, Jun. 3, 2019, Retrieved at https://arxiv.org/pdf/1906.01099. pdf.

EventHelix, "LTE eNB—5G gNB dual connectivity (EN-DC)", available at https://www.eventhelix.com/5G/non-standalone-access-en-dc/en-dc-secondary-node-addition.pdf at least as of Feb. 20, 2019.

EventHelix, "5G secondary node addition" available at https://www.eventhelix.com/5G/non-standalone-access-en-dc/4G-CN.pdf at least as of Feb. 20, 2019.

* cited by examiner ized Subscription Identifier (SUCI). The PLMN-ID is the Public Land Mobile Network ID, the MSIN is the Mobile Subscriber Identification Number, and the SUCI is the Subscription Concealed Identifier.

MONITORING IN A 5G NON-STANDALONE ARCHITECTURE TO DETERMINE BEARER TYPE

CROSS-REFERENCE TO RELATED APPLICATION(S)

The present disclosure claims priority to U.S. Provisional Patent Application No. 62/904,865, filed Sep. 24, 2019, and to U.S. Provisional Patent Application No. 63/011,607, filed Apr. 17, 2020, the contents of each are incorporated by reference in their entirety.

FIELD OF THE DISCLOSURE

The present disclosure generally relates to 5G networking. More particularly, the present disclosure relates to systems and methods for monitoring in a 5G Non-Standalone (NSA) architecture to determine user plane bearer type, including identification of whether a bearer is over a 4G radio network element (eNodeB) or a 5G radio network element (gNodeB).

BACKGROUND OF THE DISCLOSURE

The initial deployments of 5G (fifth-generation cellular network technology) will be classified as Non-Standalone (NSA), meaning that the 5G networks will initially be supported by existing 4G (LTE) infrastructure. In the NSA mode, 5G-enabled devices connect to 5G frequencies for data-throughput improvements but still use 4G for non-data functions such as communication to the cell towers and servers. That is, the NSA mode that depends on the control plane of the existing 4G (LTE) network for control functions, while the 5G NR (New Radio) utilizes 5G features on the user plane. The advantage of this approach is to speed up 5G adoption. The user plane (sometimes known as the data plane, forwarding plane, carrier plane or bearer plane) carries the network user traffic, whereas the control plane carries signaling traffic. The 5G NR is a Radio Access Technology (RAT) for the 5G network, i.e., the global standard for the air interface of 5G networks.

Network operators perform network monitoring for various administrative, management, billing, etc. purposes. However, with the 5G NSA architecture, there does not exist a technique to determine if a user plane bearer is over a 4G radio network element (eNodeB) or a 5G radio network element (gNodeB). Specifically, in the 5G NSA architecture, the core network and the protocols around a Serving Gateway (SGW) remain the same as in 4G. Disadvantageously, there is no new information on the S11 interface (the interface between the MME and an SGW in an LTE network) to identify if a bearer is done on a 4G radio network element (eNodeB) or a 5G radio network element (gNodeB). This is a problem as the capture stage does not get any 5G indicator on the SGW, and the network operator is unable to distinguish bearer types in a 5G NSA network.

BRIEF SUMMARY OF THE DISCLOSURE

The present disclosure relates to systems and methods for monitoring in a 5G Non-Standalone (NSA) architecture to determine user plane bearer type, including identification of whether a bearer is over a 4G radio network element (eNodeB) or a 5G radio network element (gNodeB). This identification is utilized in a monitoring system for the mobile network, and it is based solely on monitoring messages over the S11 interface. Specifically, the present disclosure includes a technique to identify gNodeB addresses in messages on the S11 interface. These addresses are stored in a database of known gNodeB's and utilized later to determine bearer type, i.e., if the address is in the database, the user plane includes a 5G NSA bearer; otherwise, the user plane includes a 4G bearer.

In an embodiment, the systems and methods can be implemented as instructions in a non-transitory computer-readable medium. In another embodiment, the systems and methods can be a computer-implemented method. In a further embodiment, the systems and methods include a processing device for implementing the bearer type identification. The systems and methods include obtaining monitored messages between a Mobility Management Entity (MME) and a Serving Gateway (SGW) in a 5G Non-Standalone (NSA) system; detecting base stations that are gNodeB base stations based on the monitored messages; and storing the detected gNodeB base stations in a database of known gNodeB base stations in the 5G NSA system.

The systems and methods can further include identifying a bearer as utilizing 5G Radio Access Technology based on a presence of an address associated with the detected gNodeB base stations in the database of known gNodeB base stations. The systems and methods can further include identifying a bearer as utilizing 4G Radio Access Technology based on a lack of the presence of the address in the database of known gNodeB base stations. The detecting can be based on a second Modify Bearer Request or Response message after a first Modify Bearer Request or Response message and a Create Session Request or Response message. The second Modify Bearer Request or Response message is one of i) without an eNodeB identifier and ii) with an eNodeB identifier from the corresponding Create Session Request or Response message, each indicating a new address associated with the second Modify Bearer Request or Response message is a gNodeB base station.

The monitored messages can be associated with establishing tunnels with Tunnel Endpoint Identifiers (TEID) between the SGW and the base stations. The monitored messages can be obtained from an S11 control plane interface. The monitored messages can be obtained at the SGW. The systems and methods can further include providing the database of known gNodeB base stations to a monitoring system for use in the identification of the bearer type.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
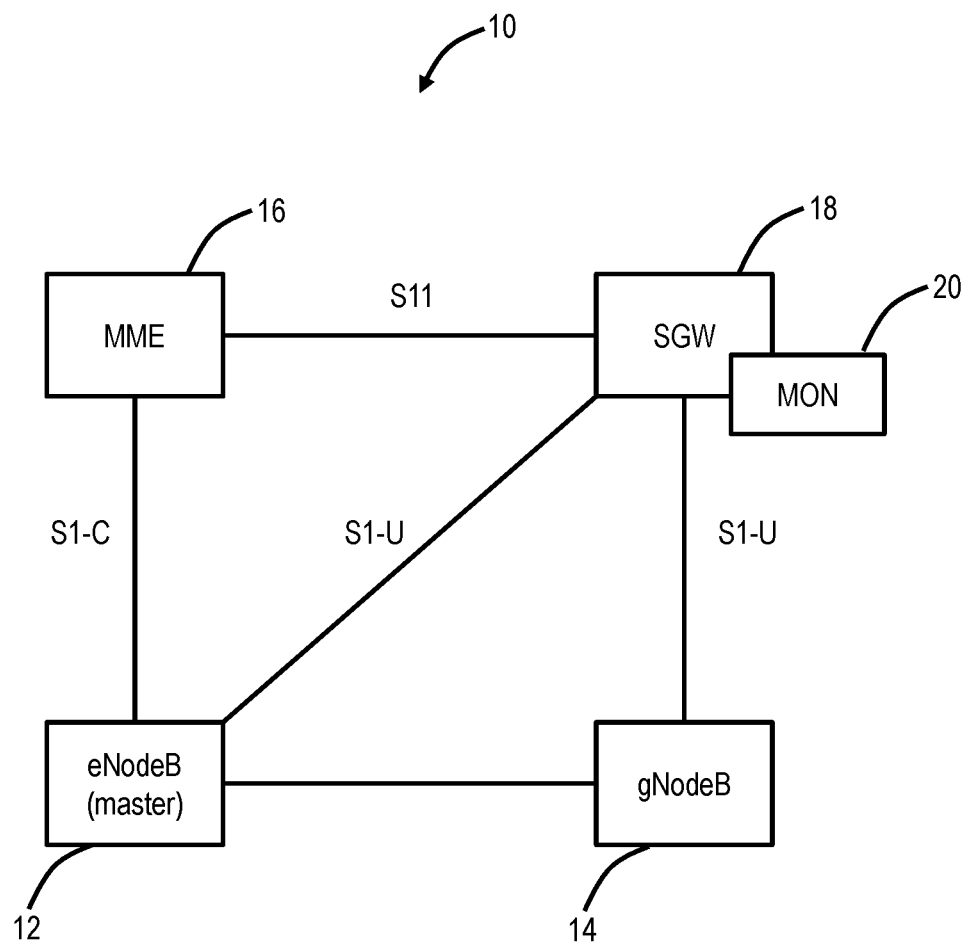
FIG. 1 is a block diagram of select interfaces in a 5G NSA system.

Again, the present disclosure relates to systems and methods for monitoring in a 5G Non-Standalone (NSA)

architecture to determine user plane bearer type, including identification of whether a bearer is over a 4G radio network element (eNodeB) or a 5G radio network element (gNodeB). This identification is utilized in a monitoring system for the mobile network, and it is based solely on monitoring messages over the S11 interface. Specifically, the present disclosure includes a technique to identify gNodeB addresses in messages on the S11 interface. These addresses are stored in a database of known gNodeB's and utilized later to determine bearer type, i.e., if the address is in the database, the user plane includes a 5G NSA bearer; otherwise, the user plane includes a 4G bearer.

The following acronyms are utilized herein:

| Term | Definition |
| --- | --- |
| 3GPP | $3^{rd}$ Generation Partnership Project |
| DL | Downlink |
| eNodeB | Evolved Node B (4G base station) |
| EPC | Evolved Packet Core (EPC) which is a framework for converging voice and data in LTE (4G) and includes the MME, SGW, etc. |
| EUTRAN | Evolved Universal Mobile Telecommunications System Terrestrial Radio Access Network which is the Radio Access Technology (RAT) for the 4G |
| gNodeB | 5G base station |
| IP | Internet Protocol |
| LTE | Long Term Evolution (4G) |
| MME | Mobility Management Entity which is the control node in the LTE (4G) access network. It is involved in the bearer activation/deactivation process and is also responsible for choosing the SGW for a UE at the initial attach and at time of intra-LTE handover involving Core Network (CN) node relocation. |
| NR | New Radio which is the Radio Access Technology (RAT) for the 5G |
| NSA | Non-Standalone |
| PGW | Packet Data Network Gateway which provides from the UE to external packet data networks by being the point of exit and entry of traffic for the UE |
| RAT | Radio Access Technology |
| SGW | Serving Gateway which routes and forwards user data packets, while also acting as the mobility anchor for the UP during inter-eNodeB handovers and as the anchor for mobility between LTE and other 3GPP technologies (terminating S4 interface and relaying the traffic between 2G/3G systems and PGW) |
| TEID | Tunnel Endpoint Identifier |
| UE | User Equipment which is a user device connecting to the mobile network. |
| UL | Uplink |
| ULI | User Location Info |
| UP | User Plane |

The present disclosure relates to systems and methods for monitoring in a 5G Non-Standalone (NSA) architecture to determine bearer type, including identification of whether a bearer is over a 4G radio network element (eNodeB) or a 5G radio network element (gNodeB). As described herein, with the 5G NSA architecture, the Evolved Packet Core (EPC), i.e., the MME, the SGW, etc., is not impacted, so there is no technique to determine if a UE is connected to an eNodeB (4G) or a gNodeB (5G). The present disclosure is utilized in a user plane monitoring system for a mobile network, to enable identification of a bearer type in a data record in the user plane on the radio access technology (4G or 5G).

The present disclosure describes systems and methods for detecting base stations that are gNodeB base stations based on Modify Bearer Requests on the S11 interface. Specifically, it is noted that the S11 messages can be monitored to detect IP addresses of gNodeBs for storing in a database to later use in identifying bearer types. The sequence of S11 messages can include a Create Session Request/Response and a first Modify Bearer Request/Response after the Create Session Request/Response. The IP address for the DL in the first Modify Bearer Request/Response is for an eNodeB since this is a 5G NSA system. It is determined that if there is a second Modify Bearer Request/Response with a new IP address for the DL that this new IP address for the DL identifies a gNodeB.

FIG. 1 is a block diagram of select interfaces in a 5G NSA system 10. The 5G NSA system 10 includes an eNodeB 12, a gNodeB 14, an MME 16, and an SGW 18. Of course, there are additional interfaces and elements in the 5G NSA system 10, which are omitted for illustration purposes. In an embodiment, there is a monitoring system 20, which can be a physical system interacting with the SGW 18, a method implemented on or with the SGW 18, computer-readable code executed on or with the SGW 18, etc. The monitoring system 20 is configured to capture data associated with the operation of the 5G NSA system 10. Such captured data is utilized by a network operator for various network operations, management, and billing purposes.

In a 4G core network, the capture of user plane information is performed at or on the SGW 18, with the monitoring system 20. The monitoring system 20 can also capture control plane information for use with the user plane information. For example, the control plane information can include RAT type, the network element, etc. Again, the control plane information and the user plane information are captured and monitored by the monitoring system 20 for use by the network operator of the 5G NSA system 10 for various network management purposes.

In a 4G architecture, a control plane S11 interface allows a correlation between the control plane and the user plane. The RAT type (EUTRAN for 4G) and the 4G radio network element (eNodeB) are provided over the control plane S11 interface and can be included in user plane data records, such as in the monitoring system 20.

As described herein, for the monitoring system 20, a data record is a listing of data of user plane activity between a UE and an application server. The data record can be a Call Detail Record (CDR). The data record can provide subscriber information, network information, user plane information as the application, the exchanged data volumes, and the throughput in the downlink and uplink directions. The information of the RAT is important to capture for the network operator. The present disclosure relates, in part, to data records and 5G NR UP bearer identification.

With the 5G NSA system 10, the core network and the protocols around the SGW 18 remain the same. There is no new information on the control plane S11 interface to identify if a bearer is done on a 4G radio network element (eNodeB 12) or a 5G radio network element (gNodeB 14). That is, there is no 5G indicator on the SGW. The RAT type remains the EUTRAN whatever the connected RAT A bearer refers to a path that user traffic takes in a network, such as between UE and a Packet Data Network Gateway (PGW). With the 5G NSA system 10, the S1-U (S1 user plane) bearer can be either 4G or 5G, and the present disclosure relates to the identification of an S1-U bearer between the SGW and the eNodeB 12 (4G radio equipment), or the gNodeB 14 (5G radio equipment). That is, the present disclosure provides a technique for how to identify the eNodeB 12 (4G radio equipment) and the gNodeB 14 (5G radio equipment) in the control plane signaling, via the S11 interface.

Possible Identification Solutions

A first approach to differentiate the S1-U bearers is to identify gNodeB elements in a topology file manually. Here, the monitoring system 20 can declare any S1-U bearers from the identified gNodeB elements as using a 5G bearer while others are a 4G bearer. However, this approach requires constant updating for a network operator as new elements are constantly deployed (i.e., new gNodeBs are deployed regularly). This approach is administratively difficult to implement.

Another approach can include capturing the whole S1 Interface on the MME 16 and follow-up to get 5G mobility information. However, this approach deteriorates performance. To get some specific messages on the S1-C interface, the S6a interface must be beforehand captured and processed to decipher all S1-C messages.

Automatic gNodeB Identification

The present disclosure includes a technique to automatically identify a gNodeB and create an automatic topology to identify a 5G bearer. The technique relies on messages to determine the bearer type. Specifically, the present disclosure can automatically identify the gNodeBs 14 (based on their address) and determine any bearers are 5G based on the address of the automatically identified gNodeBs 14 being present (indicating a 5G NSA bearer) or not present (indicating a 4G bearer).

For the 5G NSA system 10, the S1-C interface (S1 control plane) is updated with a new message to change the user plane IP address and the TEID DL (@IP-U/TEID DL). On the S11 interface, there is no specific information to identify a @IP-U/TEID DL allocated for a gNodeB 14 or an eNodeB 12.

The present disclosure includes a process to automatically identify the IP addresses of the gNodeBs 14 in the 5G NSA system 10. Once identified, each IP address of the gNodeBs 14 is added to a list. The list can be utilized by the monitoring system 20 to identify 5G bearers.

Figure 2:
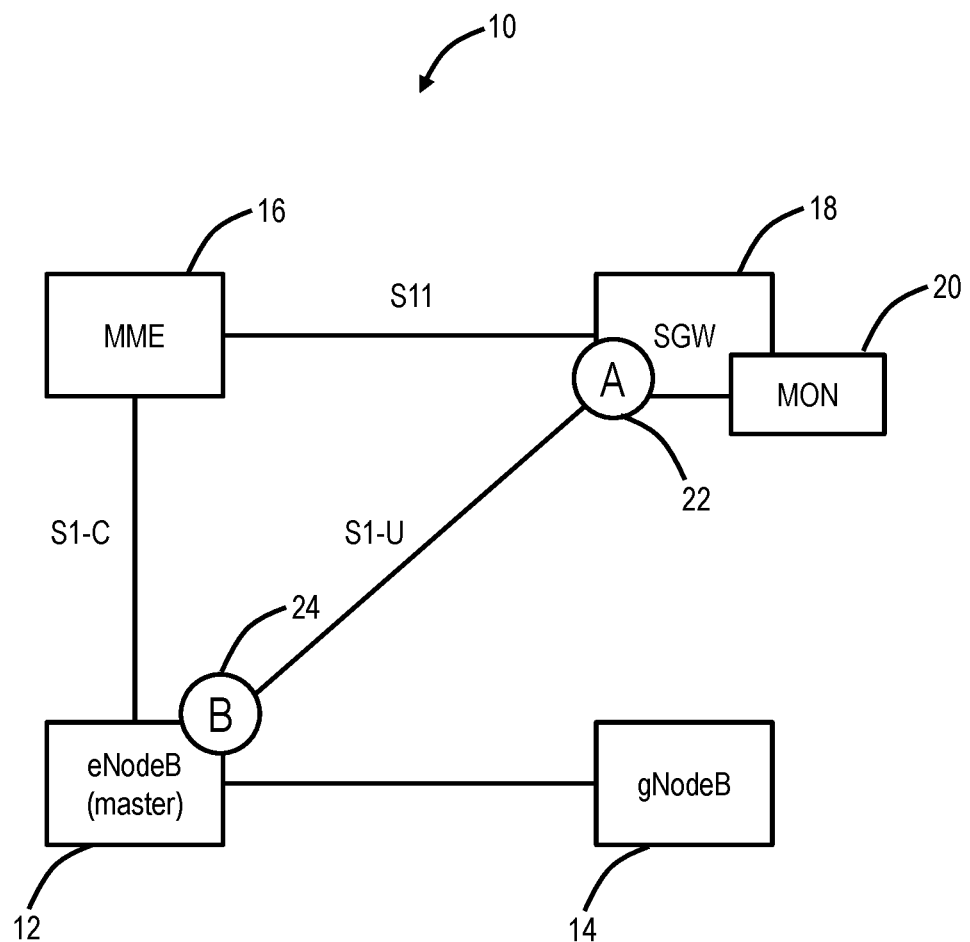
FIG. 2 is a block diagram of select interfaces in the 5G NSA system for creating a session and for a first modified bearer.
Figure 3:
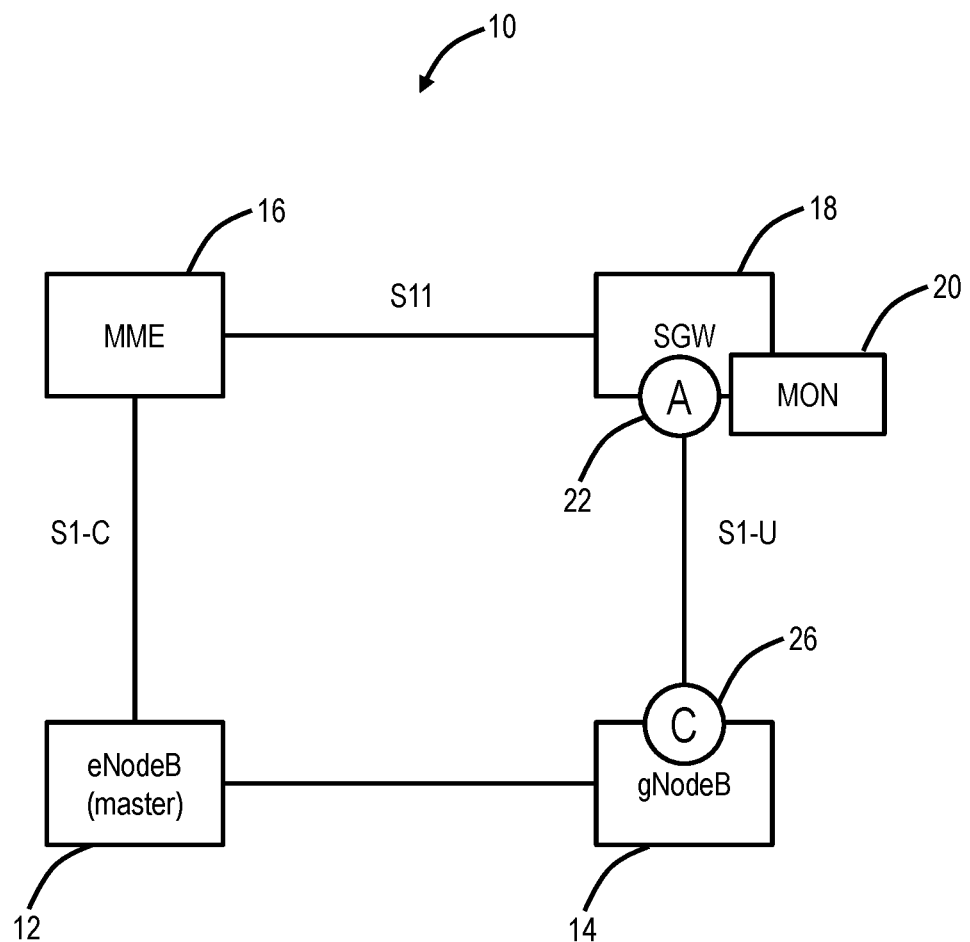
FIG. 3 is a block diagram of select interfaces in the 5G NSA system for a second modified bearer.

FIG. 2 is a block diagram of select interfaces in the 4G system 10 for creating a session and for a first modified bearer. FIG. 3 is a block diagram of select interfaces in the 5G NSA system 10 for a second modified bearer.

In FIG. 2, at a first step where a session is created with a Create Session request and a Create Session Response message, over the S11 interface, a @IP-U/TEID UL 22 is created at the SGW 18. The uplink user plane packets are sent from the eNodeB 12 to the SGW 18, via the @IP-U/TEID UL 22. Here, the eNodeB 12 is identifier (as a master) with its eNodeB identifier (ID).

In FIG. 2, at a second step where there is a first modification of the bearer with a first request and a first response message, over the S11 interface, a @IP-U/TEID DL 24 is created at the eNodeB 12. Here, downlink and uplink user plane packets are sent between the SGW 18 to the eNodeB 12, via the @IP-U/TEID UL 22 and the @IP-U/TEID DL 24. Here, the first modification is down for the @IP-U/TEID DL 24.

In FIG. 3, at a third step, where there is a 5G bearer, there is a second modification of the bearer with a second request and a second response message, over the S11 interface, and a @IP-U/TEID DL 26 is allocated at the gNodeB 14. Now, downlink and uplink user plane packets are sent between the SGW 18 to the gNodeB 14, via the @IP-U/TEID UL 22 and the @IP-U/TEID DL 26. The second modification switches to the gNodeB 14, from the eNodeB 12.

The present disclosure is based in part on the detection of the second modification with a new @IP-U//TEID, and without an eNodeB ID change, i.e., no new eNodeB ID is in the User Location Info (ULI) in this second Modify Bearer Request/Response. The eNodeBID remains the eNodeB master (associated with the S1-C interface; there is no S1-C with the gNodeB). Generally, a second Modify Bearer can be used to allocate a new @IP-U//TEID with a new eNodeB or for a Quality of Service (QoS) change. The present disclosure notes that a gNodeB 14 can be detected in a 5G NSA with the second Modify Bearer message having a new @IP-U//TEID and no new eNodeB ID.

Here, in FIG. 3, the gNodeB 14 can be automatically detected as a gNodeB (versus an eNodeB in the 5G NSA system 10) because the eNodeB ID in the second Modify Bearer Request is not sent in the ULI, so there is no change in the master eNodeB ID. Also, the second Modify Bearer Request may include the eNodeB ID in the ULI, without a change. So, to detect a gNodeB, it must have a new @IP-U//TEID and no eNodeID change. The second condition (no eNodeID change) means either no eNodeID is present in the ULI, or it is present in the ULI with the same eNodeID in the create session request.

The steps in FIGS. 2 and 3 are performed where various sessions are created in the 5G NSA system 10. From these steps, it is possible for the monitoring system 20 to automatically detect the IP addresses of the gNodeBs 14 in the 5G NSA system 10. That is, session creation in the 5G NSA system 10 requires two bearer modifications—one to create a bearer (the @IP-U/TEID DL 24) on the eNodeB 12 and a second one to create a bearer (the @IP-U/TEID DL 26) on the gNodeB 14.

It has been determined that the gNodeB 14 can be tagged as a gNodeB where the second bearer request fails to change the master eNodeB.

Thus, because there is a second Modify Bearer Request without a change in the master eNodeB ID, it can automatically be assumed the IP address of the element having the @IP-U/TEID DL 26 is a gNodeB 14, and this IP address can be added to a list, flagged, etc. as being a gNodeB 14. Accordingly, every new or reactivated bearer with an IP address of the list can be tagged with a RAT 5G bearer.

Process

Figure 4:
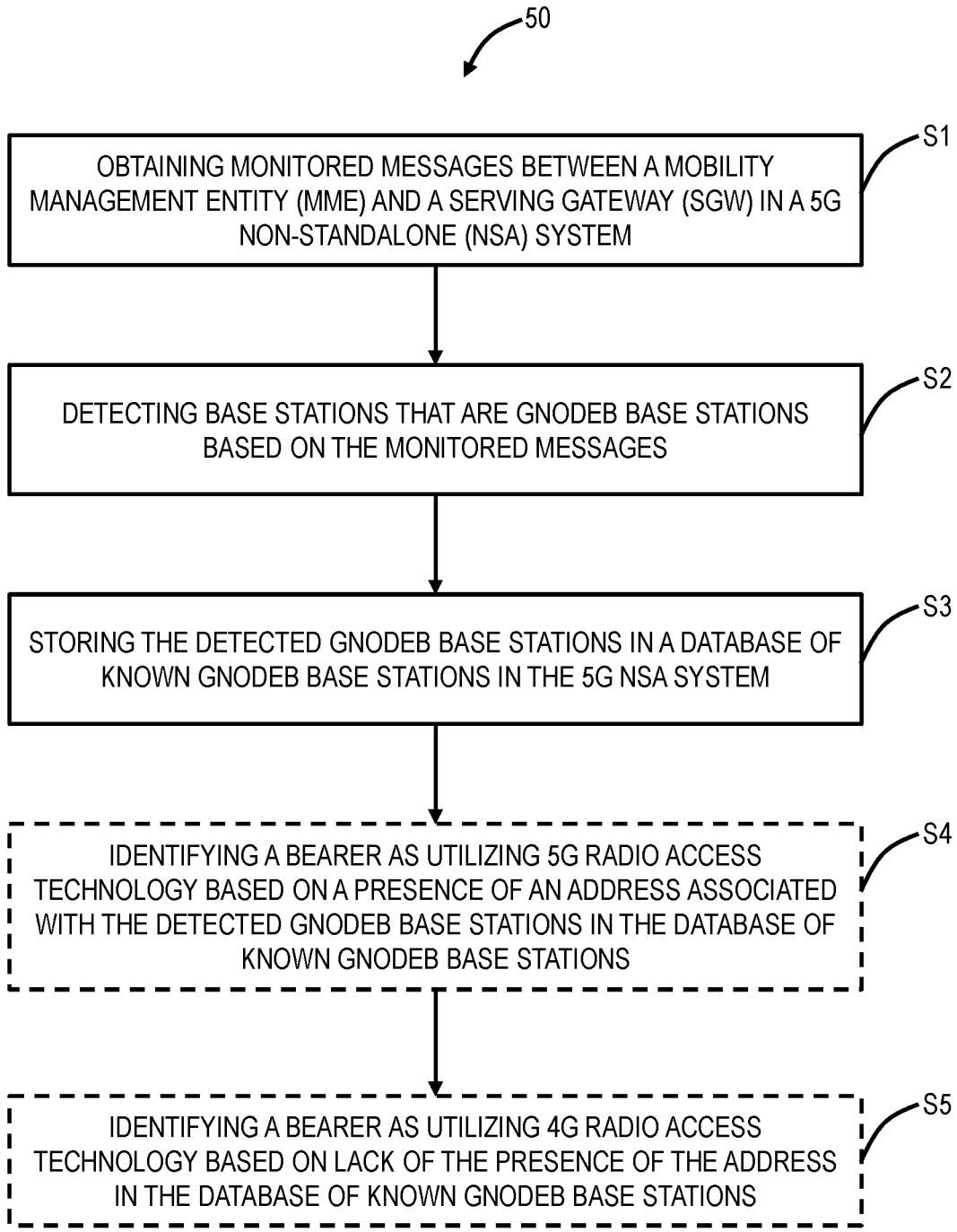
FIG. 4 is a flowchart of a process for automatic identification of gNodeB base stations.

FIG. 4 is a flowchart of a process 50 for automatic identification of gNodeB base stations. The process 50 can be a method implemented in the 5G NSA system 10, implemented in a non-transitory computer-readable medium having instructions stored thereon for programming a processor, or implemented in a processing device 100, implemented via the SGW 18, the monitoring system 20, etc.

The process 50 includes obtaining monitored messages between a Mobility Management Entity (MME) and a Serving Gateway (SGW) in a 5G Non-Standalone (NSA) system (step S1); detecting base stations that are gNodeB base stations based on the monitored messages (step S2); and storing the detected gNodeB base stations in a database of known gNodeB base stations in the 5G NSA system (step S3).

The process 50 can further include identifying a bearer as utilizing 5G Radio Access Technology based on a presence of an address associated with the detected gNodeB base stations in the database of known gNodeB base stations (step S4). The process 50 can also further include identifying a bearer as utilizing 4G Radio Access Technology based on lack of the presence of the address in the database of known gNodeB base stations (step S5).

The detecting step S2 can be based on a second Modify Bearer Request or Response message after a first Modify Bearer Request or Response message and a Create Session Request or Response message. The second Modify Bearer Request or Response message is one of i) without an eNodeB identifier and ii) with an eNodeB identifier from the corresponding Create Session Request or Response message, each indicating a new address associated with the second Modify Bearer Request or Response message is a gNodeB base station.

The monitored messages can be associated with establishing tunnels with Tunnel Endpoint Identifiers (TEID) between the SGW and the base stations. The monitored messages can be obtained from an S11 control plane interface. The monitored messages can be obtained at the SGW.

The process 50 can further include providing the database of known gNodeB base stations to a monitoring system for use in the identification of bearer type. Further, the process 50 can be implemented periodically to learn new gNodeB base stations. Also, it is possible to age out entries in the database of known gNodeB base stations to remove entries. For example, if a particular gNodeB base station's IP address is not seen in a certain time period, the gNodeB base station's IP address is removed from the database.

Example Processing Device Architecture

Figure 5:
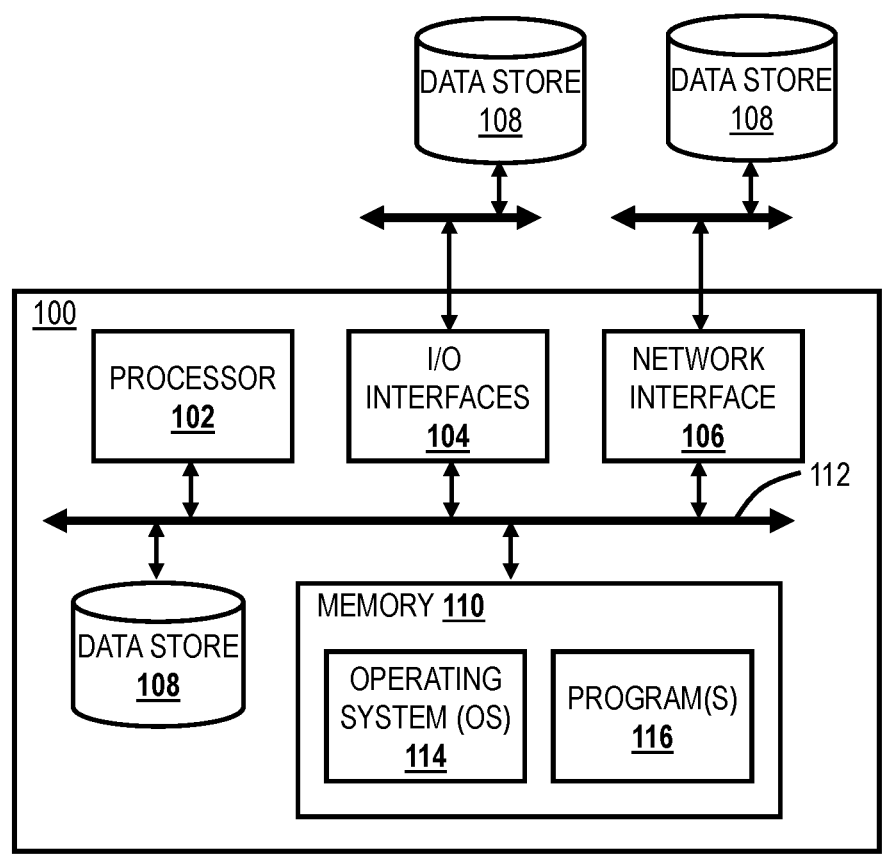
FIG. 5 is a block diagram of a processing device that may implement a monitoring system for the 5G NSA system.

FIG. 5 is a block diagram of a processing device 100 that may implement the monitoring system 20. The processing device 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 5 depicts the processing device 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the processing device 100, a semiconductor-based microprocessor (in the form of a microchip or chipset), or generally any device for executing software instructions. Also, the processor 102 can include a multi-core design, i.e., multiple processors. When the processing device 100 is in operation, the processor 102 is configured to execute software stored within the memory 110, to communicate data to and from the memory 110, and to generally control operations of the processing device 100 pursuant to the software instructions. The I/O interfaces 104 may be used to receive user input from and/or for providing system output to one or more devices or components. The user input may be provided via, for example, a keyboard, touchpad, touch screen, and/or a mouse. System output may be provided via a display device and a printer. I/O interfaces 204 may include, for example, a serial port, a parallel port, a Small Computer System Interface (SCSI), a Serial ATA (SATA), a fiber channel, InfiniBand, iSCSI, a PCI Express interface (PCI-x), an Infrared (IR) interface, a Radio Frequency (RF) interface, a Universal Serial Bus (USB) interface, or the like.

The network interface 106 may be used to enable the processing device 100 to communicate over a network, etc.

The network interface 106 may include, for example, an Ethernet card or adapter or a Wireless Local Area Network (WLAN) card or adapter. The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the processing device 100, such as, for example, an internal hard drive connected to the local interface 112 in the processing device 100. Additionally, in another embodiment, the data store 108 may be located external to the processing device 100, such as, for example, an external hard drive connected to the I/O interfaces 104 (e.g., SCSI or USB connection). In a further embodiment, the data store 108 may be connected to the processing device 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services.

The one or more programs 116 may be configured to implement the various processes, algorithms, methods, techniques, etc. described herein, such as with respect to user plane bearer type determination. In an embodiment, the programs 116 can be configured to cause the processor 102 to obtain monitored messages between a Mobility Management Entity (MME) and a Serving Gateway (SGW) in a 5G Non-Standalone (NSA) system; detect base stations that are gNodeB base stations based on the monitored messages; and store the detected gNodeB base stations in a database of known gNodeB base stations in the 5G NSA system.

The processing device 100 can further be configured to identify a bearer as utilizing 5G Radio Access Technology based on a presence of an address associated with the detected gNodeB base stations in the database of known gNodeB base stations and identify a bearer as utilizing 4G Radio Access Technology based on lack of the presence of the address in the database of known gNodeB base stations.

The processing device 100 is being used to identify the gNodeB base stations in the 5G NSA system 10 and store such addresses in the database. In an embodiment, the processing device 100 can be configured to provide the database of known gNodeB base stations to the monitoring system 20 for use in the identification of bearer type. In another embodiment, the processing device 100 can be configured to perform both the detection of gNodeB base stations for the database and the identification of bearer type, i.e., the processing device 100 can be the monitoring system 20.

As described herein, the base stations are detected based on a second Modify Bearer Request or Response message after a first Modify Bearer Request or Response message and a Create Session Request or Response message. The second Modify Bearer Request or Response message is one of i) without an eNodeB identifier and ii) with an eNodeB identifier from the corresponding Create Session Request or Response message, each indicating a new address associated with the second Modify Bearer Request or Response message is a gNodeB base station.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processor to perform the steps of:
   obtaining monitored messages between a Mobility Management Entity (MME) and a Serving Gateway (SGW) in a 5G Non-Standalone (NSA) system;
   detecting base stations that are gNodeB base stations based on the monitored messages that are from an S11 control plane interface; and
   storing identifiers of the detected gNodeB base stations in a database of known gNodeB base stations in the 5G NSA system.

2. The non-transitory computer-readable medium of claim 1, wherein the instructions program the process to further perform the steps of
   identifying a bearer as utilizing 5G Radio Access Technology based on a presence of an address associated with the detected gNodeB base stations in the database of known gNodeB base stations.

3. The non-transitory computer-readable medium of claim 2, wherein the instructions program the process to further perform the steps of
   identifying a bearer as utilizing 4G Radio Access Technology based on lack of the presence of the address in the database of known gNodeB base stations.

4. The non-transitory computer-readable medium of claim 1, wherein the detecting is based on a second Modify Bearer Request or Response message after a first Modify Bearer Request or Response message and a Create Session Request or Response message.

5. The non-transitory computer-readable medium of claim 4, wherein the second Modify Bearer Request or Response message is one of i) without an eNodeB identifier and ii) with an eNodeB identifier from the corresponding Create Session Request or Response message, each indicating a new address associated with the second Modify Bearer Request or Response message is a gNodeB base station.

6. The non-transitory computer-readable medium of claim 1, wherein the monitored messages are associated with establishing tunnels with Tunnel Endpoint Identifiers (TEID) between the SGW and the base stations.

7. The non-transitory computer-readable medium of claim 1, wherein the monitored messages are obtained at the SGW.

8. The non-transitory computer-readable medium of claim 1, wherein the instructions program the process to further perform the steps of
   providing the database of known gNodeB base stations to a monitoring system for use in identification of bearer type.

9. The non-transitory computer-readable medium of claim 1, wherein the monitored messages that are on an S11 control plane interface are sent between the SGW and the MME.

10. A method comprising:
    obtaining monitored messages between a Mobility Management Entity (MME) and a Serving Gateway (SGW) in a 5G Non-Standalone (NSA) system;
    detecting base stations that are gNodeB base stations based on the monitored messages that are from an S11 control plane interface; and
    storing identifiers of the detected gNodeB base stations in a database of known gNodeB base stations in the 5G NSA system.

11. The method of claim 10, further comprising
    identifying a bearer as utilizing 5G Radio Access Technology based on a presence of an address associated with the detected gNodeB base stations in the database of known gNodeB base stations.

12. The method of claim 11, further comprising
identifying a bearer as utilizing 4G Radio Access Technology based on lack of the presence of the address in the database of known gNodeB base stations.

13. The method of claim 10, wherein the detecting is based on a second Modify Bearer Request or Response message after a first Modify Bearer Request or Response message and a Create Session Request or Response message.

14. The method of claim 13, wherein the second Modify Bearer Request or Response message is one of i) without an eNodeB identifier and ii) with an eNodeB identifier from the corresponding Create Session Request or Response message, each indicating a new address associated with the second Modify Bearer Request or Response message is a gNodeB base station.

15. The method of claim 10, wherein the monitored messages are associated with establishing tunnels with Tunnel Endpoint Identifiers (TEID) between the SGW and the base stations.

16. The method of claim 10, further comprising
providing the database of known gNodeB base stations to a monitoring system for use in identification of bearer type.

17. A system comprising:
a processor; and
memory comprising instructions that, when executed, cause the processor to
obtain monitored messages between a Mobility Management Entity (MME) and a Serving Gateway (SGW) in a 5G Non-Standalone (NSA) system;
detect base stations that are gNodeB base stations based on the monitored messages that are from an S11 control plane interface; and
store identifiers of the detected gNodeB base stations in a database of known gNodeB base stations in the 5G NSA system.

18. The system of claim 17, wherein the instructions that, when executed, cause the processor to
identify a bearer as utilizing 5G Radio Access Technology based on a presence of an address associated with the detected gNodeB base stations in the database of known gNodeB base stations, and
identify a bearer as utilizing 4G Radio Access Technology based on lack of the presence of the address in the database of known gNodeB base stations.

19. The system of claim 17, wherein the base stations are detected based on a second Modify Bearer Request or Response message after a first Modify Bearer Request or Response message and a Create Session Request or Response message.

20. The system of claim 19, wherein the second Modify Bearer Request or Response message is one of i) without an eNodeB identifier and ii) with an eNodeB identifier from the corresponding Create Session Request or Response message, each indicating a new address associated with the second Modify Bearer Request or Response message is a gNodeB base station.

* * * * *